United States Patent [19]
Ritz et al.

[11] 4,016,141
[45] Apr. 5, 1977

[54] EPOXY RESIN CONTAINING ACETOACETIC GROUPS

[75] Inventors: Jürgen Ritz, Nierstein; Johannes Reese, Wiesbaden-Biebrich, both of Germany

[73] Assignee: Hoechst Aktiengesellschaft, Frankfurt, Germany

[22] Filed: June 3, 1974

[21] Appl. No.: 475,965

Related U.S. Application Data

[63] Continuation of Ser. No. 239,325, March 29, 1972, abandoned.

[30] Foreign Application Priority Data

July 30, 1971 Germany ......................... 2338116
Dec. 24, 1971 Germany ......................... 2164489

[52] U.S. Cl. .................. 260/47 EP; 260/2 EP; 260/18 EP; 260/32.8 EP; 260/33.2 EP; 260/33.6 EP; 260/37 EP; 260/50; 260/51.5; 260/57 C; 260/348 R; 260/830 P; 260/830 TW; 260/831; 260/834; 260/835; 260/837 R; 260/DIG. 4

[51] Int. Cl.$^2$ ................................. C08G 30/04
[58] Field of Search ......... 260/47 EP, 2 EP, 18 EP, 260/DIG. 4

[56] References Cited

UNITED STATES PATENTS 2,801,228  7/1957  Starck .................... 260/47

FOREIGN PATENTS OR APPLICATIONS 1,036,574  7/1966  United Kingdom ................ 260/47

*Primary Examiner*—Theodore E. Pertilla
*Attorney, Agent, or Firm*—Littlepage, Quaintance, Murphy & Dobyns

[57] ABSTRACT

An epoxy resin containing acetoacetic ester groups in which at least a part of the acetoacetic ester groups is enolized by atoms of at least one metal from groups I to VI or Ia to VIIIa of the Periodic Table according to Meyer and Mendelejeff which metal atoms are partially bound to the enolic oxygen of the acetoacetic ester group in the form of a chelate. A process for preparing said resins wherein an epoxy resin product containing acetoacetic ester groups is further reacted in the presence of a solvent (a) first with an alkali metal alcoholate and subsequently with at least one salt of at least one chelate-forming metal; or (b) with at least one chelate-forming metal in the presence of a tertiary amine or (c) for the preparation of an epoxy resin containing chemically bound atoms of at least one metal partially bound as a chelate an epoxy resin containing acetoacetic ester groups is further reacted in the presence of a solvent with an alcoholate of at least one chelate-forming metal.

11 Claims, No Drawings

EPOXY RESIN CONTAINING ACETOACETIC GROUPS

This is a continuation of application Ser. No. 239,325, filed Mar. 29, 1972, now abandoned.

This invention concerns improvements in epoxy resins and more particularly relates to epoxy resins modified by acetoacetic ester groups.

It has been proposed to react diketene with compounds containing alcoholic OH groups with the aid of various catalysts e.g. tertiary amines or alkali metal salts of carboxylic acids, whereby the corresponding acetoacetic esters are formed.

It is also known to react acetoacetic esters with metal compounds with the formation of stable chelates in which the metal atom is part of a ring structure.

One aspect of this invention provides an epoxy resin containing acetoacetic ester groups.

The new modified epoxy resins can be obtained if the free hydroxy groups of an epoxy resin are at least partially reacted with diketene in the presence of a catalyst to form acetoacetic ester groups.

Generally the diketene is used in a quantity at most equivalent to the free hydroxy groups. The diketene substantially only reacts with the alcoholic hydroxy groups of the epoxy resin so that acetoacetic ester is formed which at the same time has epoxide groups.

Generally the reaction is performed at elevated temperature, usually not above 120° C, and preferably in the range 40° to 80° C, the temperature being varied depending on the reactivity of the epoxy resin. Preferably the reaction is performed in the liquid phase. For example it is possible to use a liquid or molten resin or a solution or dispersion in a solvent which is inert to the diketene under the reaction conditions, such as a ketone e.g. methylethyl ketone, methylisobutyl ketone, cyclohexanone, an ethyleneglycol diether, e.g. diethylether, an aromatic hydrocarbon, chlorinated hydrocarbon or the like, permitting performing the reaction at times at room temperature. However, it may sometimes be desired to use the diketene in an excess based on the free OH groups, whereby also a proportion of the epoxide groups react. The course of the reaction according to the invention can be checked by determining the epoxide number.

It is advantageous to perform the reaction in the presence of a catalyst which does not catalyse the reaction of epoxide groups with themselves or with other groups present in the reaction mixture. Suitable catalysts are e.g. metal salts (for example alkali metal salts) of mono and polycarboxylic acids e.g. lower fatty acids such as sodium or potassium acetate or propionate, isononate or calcium acetate or other alkaline earth and alkali metal salts. Suitable starting materials include the various conventional epoxy resins provided that they contain free hydroxy groups e.g. those based on polyvalent phenols such as diphenylolpropane, diphenylolmethane, triphenylolmethane and chlorohydrins e.g. epichlorohydrin, which optionally can be substituted by e.g. alkyl, alkoxy, halogen and/or nitro groups. In addition aliphatic epoxy compounds are suitable. It is also possible to use as starting material epoxy resins which are partially esterified e.g. with saturated or unsaturated fatty acids with 1 to 22 C-atoms such as those derived from vegetable oils e.g. linseed oil, soya oil, or castor oil, or with aromatic carboxylic acids such as benzoic acid and derivatives thereof, e.g. toluic acids.

The resins modified according to the invention with acetoacetic ester groups have generally a light colour and a considerably lower viscosity and in the case of liquid resins also a lower crystallisation tendency than the starting resins. The more OH groups to be reacted, the lower the viscosity. The viscosity reduction leads to a good workability of the resins because no disadvantageous crystallisation occurs. By accurately metering the diketene e.g. one mole of diketene to two hydroxy groups, it is also possible to bring about a partial esterification of the epoxy resins. This embodiment has the advantage that the number of functional groups in the molecule and therefore the activity of the resin is increased.

The number of acetoacetic ester groups to 1000 molecular weight units depends on the type of resin used and the proportion of the OH groups reacted with the diketene based on the total of OH groups. Low molecular weight resins e.g. based on diphenylolpropane and epichlorohydrin with molecular weights of about 350 to 500 may for example have about 0.25 up to about 0.9 ketoester groups to 1000 molecular weight units. In the case of resins on the same basis having a molecular weight of 900 to 1400 a maximum of about 2 to 2.5 ketoester groups can be incorporated. Correspondingly the resins can contain e.g. at least 0.2, preferably at least 0.5 acetoacetic ester groups per 1000 molecular weight units. Below this value the optimum properties are not maintained with these epoxy resins, although epoxy resins with lower proportions of acetoacetic ester groups also fall within the scope of the invention.

Equation (1) (below) shows the reaction according to the invention of an epoxy resin (I) based on diphenylolpropane and epichlorohydrin with diketene, whereby the free hydroxy groups quantitatively react to form acetoacetic ester groups (compound III; n = 1-15).

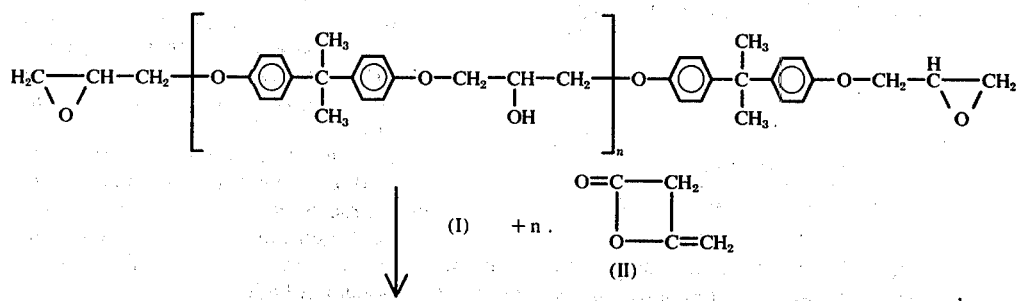

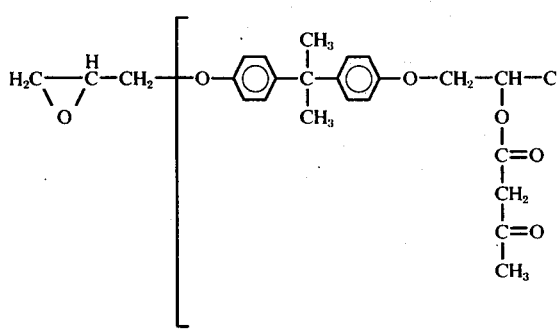
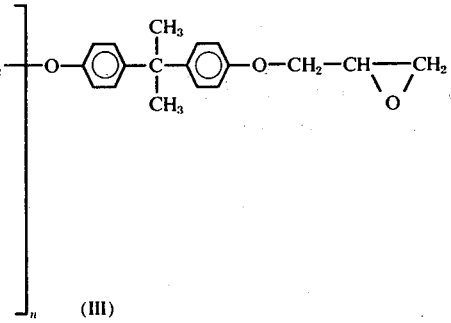

(III)

According to one embodiment of the invention, epoxy resins with a low OH group content can initially be reacted with compounds containing hydroxy groups e.g. phenols. The OH groups additionally introduced in this manner can also be converted with diketene to acetoacetic ester groups.

The resins according to the invention can also contain chemically bound metal atoms at least partially bound as chelates. These resins have the advantage that they contain in addition to metals also intact expoxide groups, which are always available for the conventional reactions of epoxide groups.

These products are prepared by further reacting the diketene-modified epoxy resin in the presence of a solvent (a) with an alcoholate of at least one chelate-forming metal; or (b) first with an alkali metal alcoholate and subsequently with at least one salt of at least one chelate-forming metal; or (c) with at least one salt of at least one chelate-forming metal in the presence of a tertiary amine.

The chelated metals incorporated are generally polyvalent, preferably divalent. Suitable chelate-forming metals are e.g. those of the first to sixth main and subsidiary groups as well as the seventh and eighth subsidiary groups of the periodic system according to Meyer and Mendelejeff, such as magnesium, calcium, zinc, cadmium, copper, cobalt, nickel, manganese, tin, lead, mercury, vanadium, cerium, aluminum, iron, chromium or titanium.

The valencies of the polyvalent metals are appropriately at least partially satisfied by chelate formation, the remaining valencies of the metal being bound, for example, to hydrocarbon groups e.g. aryl or alkyl groups (see compound VI which is illustrated hereinafter). The chelate formation reaction can greatly generalised depending on the functionality of the epoxy resin components and that of the chelate-forming metal compound.

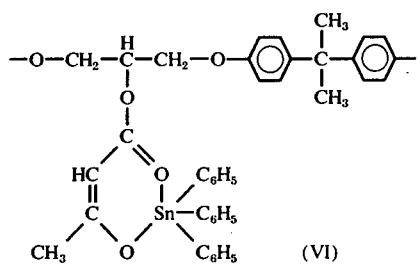

(VI)

Generally, when reacting the epoxy resins modified by the acetoacetic ester with metals, one equivalent of chelate-forming metal is employed per equivalent of acetoacetic ester. However, it is also possible to use a smaller amount of metal compound (as in Example 10 hereinafter). A mixture of several metals may also be used. It is also possible to react a mixture of chelate-forming metal compounds or perform a multistage reaction with compounds of various metals. Methods (a) to (c) are appropriately used at 0° to 120° C, preferably 10° to 60° C.

According to one embodiment of the invention the multistage chelate-forming reaction can be performed by initially reacting a proportion of the metal valencies with a low molecular weight e.g. monomeric organic compound, e.g. a $\beta$-dicarbonyl compound such as acetoacetic ester (cf. Example 14 hereinafter) or acetylacetone. Then this metal-containing reaction product is reacted with the diketene-modified epoxy resin. This procedure has the advantage that e.g. a trivalent metal can be incorporated by chelate formation, i.e. with quantitative satisfaction of all valencies, into an epoxy resin without the chelate formation leading to undesirable cross-linking.

It is also possible for the epoxide groups of the epoxy resins to be initially reacted e.g. at least partly esterified, only then introducing acetoacetic ester groups and then reacting these to form chelates.

If for example an epoxy resin having on average no more than one acetoacetic ester group per molecule is reacted with a mono or polyvalent metal compound, then low molecular weight products are obtained which can be easily processed due to their solubility in conventional solvents for epoxy resins and therefore are of particular interest.

If however, e.g. an epoxy resin with on average more than one acetoacetic ester group per molecule is reacted with a compound of a divalent metal then a higher molecular weight product is obtained. An epoxy resin which on average has two acetoacetic ester groups per molecule is bifunctional so far as concerns chelate formation. It this is now reacted with a chelate-forming compound of a divalent metal, e.g. zinc or tin and in such a way that two equivalents of acetoacetic ester groups are present per gram atom of metal then the formation of a linear polymer can be expected. In practice, besides low molecular weight and readily soluble products also high molecular weight products are obtained having a greater or lesser degree of cross-linking (cf. Example 16 hereinafter).

If an epoxy resin with on average two or more acetoacetic ester groups per molecule is reacted with a trivalent metal, then a cross-linked product (as in Example 17 hereinafter) is obtained, which generally is no longer soluble.

All of the above three embodiments of the process according to the invention have the advantage that the epoxide groups in the resins are preserved during the reaction, as may be confirmed by analysis.

In equation (2) (see below) is shown the procedure (a) for a divalent metal, wherein Me (OR)$_2$ is an alkoxide of a divalent metal, R being an alkyl group with 1 to 8, preferably 1 to 4 C-atoms, such as methyl, ethyl, propyl or butyl.

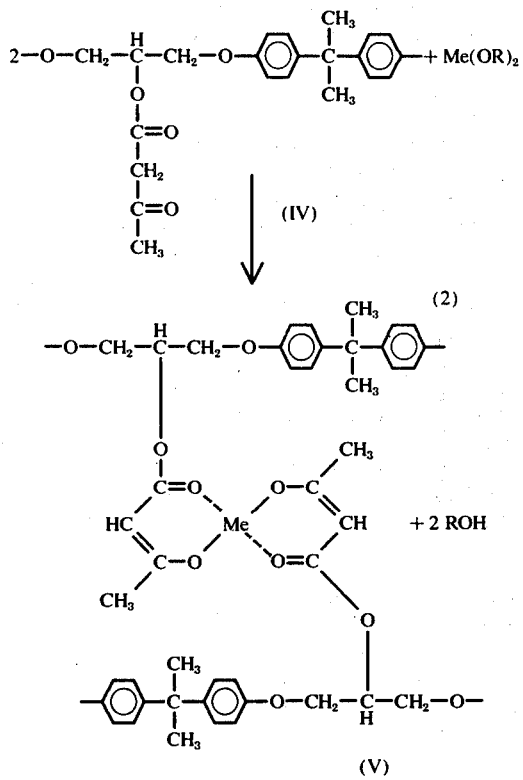

Equation (3) (below) represents the procedure (c) also for a divalent metal, wherein MeX$_2$ is a metal salt soluble in an aprotic solvent, e.g. a nitrate, nitrite, sulphate, acetate, or preferably however, a halide such as chloride, bromide or iodide.

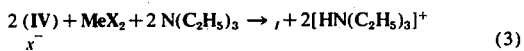

The alcohol liberated from the metal alkoxide according to embodiments (a) and (b) can be removed in a simple manner e.g. by distillation. The chelate-forming metal salt is in the embodiments (b) and (c) appropriately employed as a solution or suspension. Thus the metal from the alkoxide incorporated in the acetoacetic ester group in the first stage by enolate formation is obtained as a salt and can be removed in simple manner e.g. by filtration, decanting or centrifuging.

For embodiment (b) strongly polar aprotic solvents are suitable, preferably dimethylsulphoxide or dimethylformamide, having a good solvent power both for salts and for epoxy resins. Suitable also are for example dimethylacetamide, ethyleneglycol diethylether, tetramethylurea, tetramethylenesulphone, N-methylpyrrolidone, hexamethylphosphoric acid triamide, cyclohexanone, isophorone, acetophenone and ethylenecarbonate.

According to embodiment (c) the acid liberated during the reaction is accepted by the amine (cf. Example 13 hereinafter). In each case the presence of the solvent is necessary in order to dissolve the reagents e.g. the metal salt as well as the epoxy resin. The amine, e.g. triethylamine, is appropriately selected in such a way that it does not catalyse a reaction of the epoxide groups with themselves or with other components of the reaction mixture.

For all embodiments it is advantageous to operate under anhydrous conditions. Therefore usually the water of crystallisation present in many salts is removed before the reaction e.g. by heating. The presence of water would in many cases cause the formation of metal hydroxides which can no longer react with the acetoacetic ester groups.

Suitable tertiary amines are in particular those whose basisity (pKa-value, see Heinz Beck "Einfuhrung in die Elektronentheorie organisch-chemischer Reaktionen" (1964) page 62) is no greater than about 10 because otherwise the reaction of the epoxide groups with themseleves would be catalysed. Examples of such amines are dimethylisopropylamine, dimethyl-tert-.butylamine, N,N-dimethylaniline, tri-n-butylamine and triisopropylamine. Appropriately the amines are introduced in such a quantity that they neutralise the acid formed during chelate formation.

It is not necessary to satisfy all valencies of the metal of the chelate-forming agent by chelation with the acetoacetic ester groups. In many cases it is sufficient if the remaining valencies e.g. above 1 are satisfied by other groups e.g. by hydrocarbon groups, preferably aryl or alkyl groups. Such groups include phenyl and naphthyl groups optionally substituted by aliphatic hydrocarbon groups, e.g. by alkyl groups; and n- or iso-butyl and n- or iso-propyl groups (cf. Example 14 hereinafter). These groups are not changed during chelate formation. Such groups are preferably bound to mercury, lead and tin atoms. In this way it is possible to form a chelate with a chelate-forming compound of a tri- or higher-valent metal without an undersirable premature cross-linking of the resin occurring (cf Example 15 herein). Such a reaction product is shown in Formula (VI) above.

It is also possible to react the metal compound initially with a β-dicarbonyl compound and then react the metal-containing reaction product with the epoxy resin.

The reaction of the epoxy resins containing acetoacetic ester groups with the chelate-forming metal compounds to form chelates generally takes place at room temperature in the embodiments described above. It can, however, also be performed at higher temperatures provided due account is taken of the thermal stability of the epoxide groups. Thermal stability imposes a limit generally of 100° C, but in the process (c) the limit is lower, generally about 50° C. It is possible to check the content of expoxide groups by the known analytical process for determining the epoxide content of epoxy resins. It is also possible to follow the formation of the chelate and the disappearance of epoxide groups by infra-red spectroscopy.

The metal-containing resins have the advantage that they harden even without the addition of a hardener if they are heated for a short time e.g. up to 20 minutes at temperatures of 160° to 200° C (cf. Example 10 hereinafter). It is also, however, possible to harden them with other conventional hardeners at elevated or room temperature, whereby the hardening takes place more rapidly than that of conventional epoxy resins. The metal-containing epoxy resins can have a metal content of up to 15% by weight or even higher depending on the metal and type of epoxy resin used; with aliphatic epoxy resins in particular it can be higher.

As the epoxide groups of the metal-free and metal-containing epoxy resins according to the invention are intact they can be subjected to the conventional reactions of epoxide groups e.g. conventional hardening with polyamines. Suitable polyamines include aliphatic primary and secondary amines such as ethylenediamine, diethylenetriamine, triethylenetetramine, aromatic and cycloaliphatic amines, polyaminoamides, polyaminoimines (i.e. reaction products of polyamines with polycarboxylic acids which however still contain free primary or secondary amino groups). Other hardening agents include hydroxy containing synthetic resins such as phenol, urea and melamine resins or the etherification products thereof, polycarboxylic anhydrides, epoxy resin/amine adducts, polyhydric alcohols and the like. In addition the epoxide groups can be esterified with organic acids e.g. fatty acids with 2 to 22 C-atoms such as acetic acid or natural fatty acids, or the epoxide groups can be reacted with secondary amines. It has also been found for example, that the cold hardening of the epoxy resin with all hardeners containing amino groups, i.e. both with low molecular weight amines and also with e.g. polyaminoamide resins, proceeds much more rapidly than that of conventional epoxy resins.

In addition, specific reactions can be performed on the acetoacetic ester groups which can additionally contribute to cross-linking reactions or which are of interest per se. For example, the reaction of the acetoacetic ester group with suitable mixtures of formaldehyde and amines with the formation of Mannich bases is possible, thereby raising the viscosity of the epoxy resins. This is desirable in some cases when a rapid solidification is required. Further possibilities include e.g. the reaction of the acetoacetic ester groups with an aldehyde such as formaldehyde with the formation of a reactive alkylol, particularly methylol, groups, and the reaction with amines with the formation of $\beta$-aminocrotonic acid esters.

Due to the good hardening and other processing characteristics the epoxy resins according to the invention can be used in many ways both with and without bound metal atoms, e.g. for the production of coatings and moulded articles. Uses include lacquers, paints, adhesives, impregnating agents, coating agents, moulding materials for the production of moulded articles, particularly for electro-technical purposes as well as in the building sector for marking traffic lanes, etc. Coatings produced from the products according to the invention have good lustre, good hardness, elasticity and adhesive characteristics especially on metal surfaces such as iron, zinc, copper, aluminium or alloys thereof, such as steel, brass, bronze or the like; and non-metallic subtrates. Hardening can take place at room temperature or at elevated temperature. The coatings lose their tackiness more rapidly than coatings based on conventional non-modified epoxy resins. In addition, the coatings have a light colour, particularly those of metal-containing resins whose metal forms colourless ions such as zinc and tin.

Depending on the particular application, the resins according to the invention can also be mixed with other resins, e.g. conventional epoxy resins, alkyd resins, polyesters, phenolic and amino resins, polyurethanes or with polymerisation resins provided that they are compatible, e.g. hydrocarbon resins or acrylic resins. Generally the proportion of synthetic resin in the coatings is 20 to 100%, preferably 50 to 85% by weight based on the solids content. For the production of adhesives the products according to the invention are advantageously used in admixture with polyaminoamide resins, in particular as two-component adhesives.

The primers based on the modified epoxy resins can contain further additives in the conventional quantities such as fillers e.g. talc, mica, kaolin, chalk, quartz, flour, ground shale, asbestos flour, barium sulphate; dyes; pigments e.g. titanium dioxide, strontium chromate, zinc chromate barium chromate, lead cyanamide, lead chromate, lead silicochromate, calcium molybdate, manganese phosphate, strontium molybdate, zinc oxide, zinc silicate, zinc tetraoxychromate, zinc potassium chromate, cadmium sulphide, iron oxide, carbon black, ultramarine blue or phthalocycanine pigments; running agents; solvents, preferably those containing polar groups such as ethyleneglycol monoethyl-, monomethyl- or monobutyl-ethers or the monoacetates thereof; acetone; methylethylketone; diisobutylketone; ethyl acetate; butyl acetate; dimethylformamide; dimethylsulphoxide; mixtures of aliphatic and aromatic hydrocarbons (known under the trade name "Solvesso") with boiling points of 150° to 220° C as well as the solvents mentioned hereinbefore; lubricants, suspending agents such as finely divided silica, bentonite, colloidal silicates and the like. The mixtures are thereby appropriately adapted to the particular application.

In order that the invention may be better understood the following Examples are given by way of illustration; parts and percentages are by weight.

EXAMPLE 1

Into a 2 liter round-bottomed flask equipped with a reflux condenser, thermometer and stirrer are introduced 500 g of a solid epoxy resin with an epoxide number (weight percent epoxide oxygen) of 6.50, prepared from 4,4-diphenylolpropane and epichlorohydrin, the resin being dissolved in 125 g of methylethylketone and mixed with 0.3 g of powdered anhydrous sodium acetate. The mixture is heated to 60° C accompanied by continual stirring under a nitrogen atmosphere. Then 40 g of diketene from a dropping funnel are added dropwise in such a way that the temperature of the reaction mixture does not exceed 70° to 75° C. At the end of the addition of diketene the mixture is left for 1 hour at 60° C. The mixture is then cooled to room temperature and the sodium acetate is removed by filtration.

After distilling off the solvent under reduced pressure a reddish syrupy mass is obtained whose viscosity measured at 60° C in the rotation viscosimeter has dropped from 7.580 cP to 6.050 cp compared with the starting resin. Substantially all alcoholic OH groups of the starting epoxy resin (on average 0.5% equivalent OH per mol epoxy resin) are esterified with acetoacetic acid. The epoxide number of the product calculated from that of the starting resin is 6.00 and 6.14 was found.

EXAMPLE 2

Under the reaction conditions indicated in Example 1 700 g of a solid epoxy resin with an epoxide number of 3.34 made from diphenylolpropane and epichlorohydrin are dissolved in 300 g of methylethylketone, and after adding 0.4 g of anhydrous sodium acetate, reacted with 66 g of diketene. After distilling off the solvent a reddish solid glassy mass is obtained. Half of the alcoholic OH groups of the starting epoxy resin (on average 2.15 equivalents OH per mol of epoxide resin) are esterified with acetoacetic acid. From the epoxide number of 3.34 of the starting resin an epoxide number of 3.09 is calculated for the product and 2.90 was found.

EXAMPLE 3

Under the reaction conditions indicated in Example 1 700 g of a solid epoxy resin with an epoxide number of 1.72, prepared from diphenylolpropane and epichlorohydrin, and dissolved in 300 g of methylethylketone. After adding 1 g of anhydrous sodium acetate the resin is reacted with 168 g of diketene. After distilling off the solvent a reddish solid glassy mass is obtained. Substantially all alcoholic OH groups of the starting epoxy resin (on average 5.35 equivalent OH per mol of epoxy resin) are esterified with acetoacetic acid. From the epoxide number of 1.72 of the starting resin an epoxide number of 1.39 is calculated for the product, and 1.35 was found.

EXAMPLE 4

100 g of the product of modifying an epoxy resin with an epoxide number of 3.34 (produced from diphenylolpropane and epichlorohydrin) with diketene under the conditions indicated in Example 1 (2 mol of diketene to 1 mol of epoxide resin), the product having an epoxide number of 2.79, are dissolved in 64 g of ethylene glycol monoethylether and mixed with 17 g of dipropylenetriamine. This mixture gels after 18 minutes at 20° C.

Comparison test: 100 g of the epoxy resin used as a starting material, but not reacted with diketene, are dissolved in 64 g of ethylene glycol monoethylether and mixed with 17 g of dipropylenetriamine. This mixture only gels after 4 hours at 20° C.

EXAMPLE 5

100 g of a product obtained by reacting an epoxy resin with an epoxide number of 1.72 (made from diphenylolpropane and epichlorohydrin) with diketene (as in Example 1), (5.3 mol of diketene per 1 mol of epoxide resin), the product having an epoxide number of 1.35, are dissolved in 64 g of ethylene glycol monoethylether and mixed with 15 g of dipropylenetriamine. This mixture has a pot life of 7 minutes.

Comparison test: 100 g of the starting non-modified epoxy resin are dissolved in 64 g of ethylene glycol monoethylether and mixed with 15 g of dipropylenetriamine. This mixture has a pot life of more than 24 hours at 20° C.

EXAMPLE 6

100 g of the reaction product described in Example 5 are dissolved in 50 g of ethylene glycol monoethylether and mixed with 50 g of a commercially available polyaminoamide of a dimeric fatty acid. This mixture has a pot life of 8 minutes.

Comparison test: 100 g of the non-modified epoxide resin used as the starting material are dissolved in 50 g of ethylene glycol monoethylether and mixed with 50 g of the polyaminoamide resin used in Example 26. This mixture has a pot life of more than 7 hours at 22° C.

EXAMPLE 7

100 g of the reaction product described in Example 5 are dissolved in 45 g of methylethylketone and 50 g of toluene and mixed with 12 g of dipropylenetriamine. This mixture is applied to glass plates in layers of 100 $\mu$ thickness and stoved for 20 minutes at 400° C. A light brown glossy film was obtained with a good hardness (180 pendulum seconds measured with the pendulum device according to Konig DIN 53, 157), a very good elasticity and resistance to acetone and xylene.

EXAMPLE 8

A modified epoxy resin contaning, per molecule of epoxy resin, one acetoacetic ester group, is obtained according to Example 2 by reacting diketene with an epoxy resin having an epoxide number of 3.34 produced from 4,4'-diphenylolpropane and epichlorohydrin. A solution of 500 g of this resin in 300 g of methylethylketone is mixed with a solution of 30 g of aluminum triisoproylate in 100 g of butanol at room temperature and the mixture is stirred for 1 hour. Then the solvent is removed by distillation at 60° C and a pressure of 12 mmHg. 503 g of a resin is obtained in the form of a yellow glassy transparent solid mass. Aluminium content: calculated 0.8%; found 0.8%.

EXAMPLE 9

30.6 g of anhydrous zinc chloride are dissolved in 60 g of absolute methanol and mixed with a solution of 10.35 g of sodium in 150 ml of absolute methanol. After stirring for 30 minutes at room temperature at 22° C the sodium chloride formed is filtered off under anhydrous conditions. The zinc methoxide solution thus obtained is stirred into a solution of 510 g of the reaction product of an epoxy resin with diketene (described in Example 8) in 300 g of absolute tetrahydrofuran, at room temperature and under anhydrous conditions. After stirring for 2 hours at room temperature the solvent is removed by distillation. 515 g of a pale yellow glassy transparent solid product is obtained. Zinc content: calculated 2.78%; found: 2.64%.

EXAMPLE 10

10.9 g of anhydrous tin (II) chloride are dissolved in 20 g of absolute methanol and mixed with a solution of 2.35 g of sodium in 50 g of absolute methanol. After stirring for 30 minutes at room temperature the resulting sodium chloride is filtered off under anhydrous conditions. The tin (II) methoxide solution obtained is mixed with a solution of 167 g of the epoxy resin modified with diketene described in Example 8 dissolved in 100 ml of absolute tetrahydrofuran; the reaction is performed according to the conditions of Example 9. After distilling off the solution, 171.2 g of a pale yellow glassy transparent solid mass are obtained. Tin content: calculated 3.92%; found 4.04%.

EXAMPLE 11

220 g of the epoxy resin modified with diketene described in Example 8 dissolved in 200 g of absolute tetrahydrofuran are mixed with a solution of 4.6 g of sodium and 50 g of absolute methanol, accompanied by stirring and exclusion of atmospheric moisture at room temperature. After 10 minutes a solution of 31.8 g of anhydrous mercury (II) acetate in 75 g of absolute methanol is sprayed into the mixture. The separation of sodium acetate which starts immediately is complete after stirring for 3 hours at room temperature. The sodium acetate is filtered off. After distilling off the solvent 235 g of a yellow glassy product are obtained. Mercury content: calculated 8.50%; found 8.54%.

EXAMPLE 12

Into the solution of modified epoxy resin and sodium methoxide employed in Example 11 is stirred a solution of 32.5 g of dry lead (II) acetate in 50 g of absolute methanol. After stirring for 3 hours the precipitated sodium acetate is filtered off and the solvent is distilled off from the solution. 235 g of a yellow glassy product are obtained. Lead content: calculated 8.65%; found 8.40%.

EXAMPLE 13

A solution of 200 g of the epoxy resin product of Example 2 in 100 g of anhydrous dimethylsulphoxide is mixed while stirring with a solution of 12 g of anhydrous zinc chloride and 20 g of triethylamine in 100 g of anhydrous dimethylsulphoxide at 26° with the exclusion of moisture. After stirring for 3 hours at 26° C the product is precipitated by adding the solution dropwise to 500 g of water and separating. It is then again dissolved in 100 g of dimethylsulphoxide and again precipitated in 500 g of water. After separation of the solid the water contained in the product is removed by azeotropic distillation with toluene. Then any toluene still contained is removed by distillation. 210 g of a resin are obtained identical to that produced in Example 9. Zinc content: calculated 2.78%; found 2.80%.

EXAMPLE 14

136 g of aluminium tri-n-butoxide are dissolved in 100 g of n-butanol and heated at 60° C for 30 minutes with the exclusion of moisture with 36.4 g of ethyl acetoacetate. An epoxy resin according to Example 2 is reacted completely with diketene so that each epoxy resin molecule carries two acetoacetic ester groups. 250 g of this resin are dissolved in 100 g of methylethylketone and stirred at room temperature with the partially chelated aluminium butoxide solution. After stirring for 1 hour at 55° C the solvent is distilled off at 60° C and 12 mmHg. 312 g of a solid glassy mass are obtained. Aluminum content: calculated 2.39%; found 2.45%.

EXAMPLE 15

115.5 g of triphenyl tin chloride are dissolved in a mixture of 450 g of absolute methanol and 300 g of absolute tetrahydrofuran and mixed with a solution of 7.02 g of sodium in 150 ml of absolute methanol. After stirring for 2 hours at room temperature the resulting precipitate of sodium chloride is filtered off. The solution of triphenyl tin methoxide obtained is combined, accompanied by stirring, with a solution of 600 g of the epoxy resin modified with diketene described in Example 2 dissolved in 300 g of absolute tetrahydrofuran. After stirring for a further 2 hours at room temperature and after distilling off the solvent 696 g of a reddish brown glassy solid product of formula VI above are obtained. Tin content: calculated 5.51%; found 5.45%.

EXAMPLE 16

500 g of a diketene-modified epoxy resin based on diphenylolpropane and epichlorohydrin with an epoxide number of 1.47 containing on average 2 acetoacetic ester groups per epoxy resin molecule are dissolved in 300 g of methylethyl ketone. 29 g of zinc methoxide in 150 ml of absolute methanol are prepared as in Example 9 and are added to this solution at room temperature accompanied by stirring. After stirring for 3 hours, part of the product is precipitated in cross-linked form. After distilling off the solvent, 520 g of a glassy solid mass are obtained, which is only partially soluble.

EXAMPLE 17

500 g of the epoxy resin described in Example 16 are dissolved in 300 g of methylethyl ketone and mixed with a solution of 27.5 g of aluminium tri-n-butoxide in 30 g of n-butanol. After stirring for 2 hours the epoxy resin is in the form of an insoluble gel.

EXAMPLE 18

75.0 g of the zinc chelate prepared according to Example 9 with an epoxy resin base are dissolved in a mixture of 12.0 g of methylethyl ketone, 6.3 g of ethyleneglycol monoethyl ether and 31.3 g of toluene and mixed with 1 g of a silicone oil as the running agent. The mixture is applied to glass plates with a 100 μ triangle and stoved for 20 minutes at 180° C. A very hard glossy film of excellent elasticity is obtained.

EXAMPLE 19

A lacquer is made from 50 g of solid epoxy resin with an epoxide number of 3.09 containing acetoacetic ester groups prepared by reacting an epoxy resin of 4,4′-diphenylolpropane and epichlorohydrin with diketene in solution under nitrogen atmosphere, 4 g of melamine-formaldehyde resin and 46 g of a solvent mixture of 60 parts ethyleneglycol monoethylether, 20 parts 4-methyl-4-hydroxy-pentan-2-one and 20 parts of a mixture of aliphatic and aromatic hydrocarbons, boiling point 150° to 220° C. The laquer is applied to a substrate comprising a metal sheet and hardened for 10 minutes at 190° C in the stoving oven with circulating air. A colourless, well adhering and elastic coating is obtained. It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A vicinal epoxy resin containing acetoacetic groups being bound to a carbon atom of at least one opened epoxy group in which at least a part of the acetoacetic ester groups is enolized by atoms of at least one metal from groups I to VI or Ia to VIIIa of the Periodic Table according to Meyer and Mendelejeff which metal atoms are partially bound to the enolic oxygen of the acetoacetic ester group of the vicinal epoxy resin in the form of a chelate, the remaining valencies of the metal atoms are bound to at least one radical selected from the group consisting of
   a. an aryl group having 6 to 10 carbon atoms,
   b. an alkyl group having up to 8 carbon atoms and
   c. the enolic oxygen of a monomer compound also in the form of a chelate.

2. An epoxy resin as claimed in claim 1 wherein metal valencies which are not bound to the resin are bound to a β-dicarbonyl compound or to hydrocarbon radicals having 2 to 8 carbon atoms.

3. A shaped body comprising a vicinal epoxy resin according to claim 1.

4. An adhesive based on a vicinal epoxy resin as claimed in claim 1 being heat hardenable in the absence of a hardener.

5. A shaped body as claimed in claim 3 wherein said epoxy resin has been thermoset in the absence of a hardener.

6. A process for the preparation of a vicinal epoxy resin containing acetoacetic ester groups being bound to a carbon atom of at least one opened epoxy group and containing chemically bound metal atoms at least partially bound as a chelate wherein a vicinal epoxy resin product containing acetoacetic ester groups is further reacted in the presence of a strongly polar aprotic solvent having good solvent properties for metal salts and for vicinal epoxy resins first with an alkali metal alcoholate and subsequently with at least one salt of at least one chelate-forming metal; or (b) with at least one salt of at least one chelate-forming metal in the presence of a tertiary amine whose basicity is not more than 10.

7. A process as claimed in claim 6 wherein any of the reactions (a) to (b) is performed in the presence of a catalyst which does not catalyse a mutual reaction of epoxy groups or their reaction with other groups present in the reaction mixture.

8. A process as claimed in claim 6 wherein the amine in method (b) is present in an amount at least equimolecular to that of the acid formed during the chelate formation.

9. A process as claimed in claim 6 wherein one equivalent of acetoacetic ester groups is reacted per equivalent of chelate-forming metal compound.

10. A process as claimed in claim 6 wherein the chelate groups are present in the form of chelates of various metals.

11. A process as claimed in claim 1 wherein the tertiary amine is selected from the group consisting of dimethyliso-propyl amine, dimethyl-tert.-butyl amine, N, N-dimethyl aniline, tri-n-butylamine and triisopropylamine.

* * * * *